United States Patent
Park

Patent Number: 5,915,491
Date of Patent: Jun. 29, 1999

[54] AUTOMATIC TRAVEL CONTROL METHOD FOR AN UNMANNED VEHICLE

[75] Inventor: Byung Nam Park, Suwon, Rep. of Korea

[73] Assignee: Samsung Electronics Co., Ltd., Suwon, Rep. of Korea

[21] Appl. No.: 08/839,129

[22] Filed: Apr. 23, 1997

Related U.S. Application Data

[63] Continuation of application No. 08/547,445, Oct. 24, 1995, abandoned, which is a continuation of application No. 08/111,495, Aug. 25, 1993, abandoned.

[30] Foreign Application Priority Data

Aug. 27, 1992 [KR] Rep. of Korea ...................... 92-15481

[51] Int. Cl.⁶ ............................... B62D 1/02; G05D 1/00
[52] U.S. Cl. ............................................ 180/168; 180/167
[58] Field of Search ................................... 180/167, 168, 180/169

[56] References Cited

U.S. PATENT DOCUMENTS

| | | | |
|---|---|---|---|
| 4,088,939 | 5/1978 | Mitschke et al. | 180/168 X |
| 4,258,813 | 3/1981 | Rubel | 180/168 |
| 4,310,789 | 1/1982 | Mank et al. | 180/168 X |
| 4,361,202 | 11/1982 | Minovitch | 180/168 |
| 4,576,246 | 3/1986 | Stieber et al. | 180/168 |
| 4,714,124 | 12/1987 | Laib | 180/168 |
| 4,926,958 | 5/1990 | Nishikawa et al. | 180/168 |

FOREIGN PATENT DOCUMENTS 1-297707  11/1989  Japan.

*Primary Examiner*—Lanna Mai
*Assistant Examiner*—Bridget Avery
*Attorney, Agent, or Firm*—Burns, Doane, Swecker & Mathis, L.L.P.

[57] ABSTRACT

An automatic travel control method for a unmanned vehicle system is performed on the basis of signals indicating the existence of the curvature of a guide path and right and left digital signals indicating the degree of the curvature of the guide path. In the method, (1) where the guide path is straight, the steering of the vehicle is controlled based on both the right and left digital signals; (2) where the guide path is curved to the right, the steering of the vehicle is controlled based on the right digital signal; and (3) where the guide path is curved to the left, the steering of the vehicle is controlled based on the left digital signal. The curvature existence detecting operation is performed according to the levels of the voltage signals induced to a pair of voltage generating devices located at the right and left sides of the vehicle after generating a magnetic field by applying alternating current to the guide path. The right and left digital signals generating operation is performed by converting the voltage signals induced to the pair of voltage generating devices into corresponding digital signals. An automatic travel control apparatus is also provided.

3 Claims, 3 Drawing Sheets

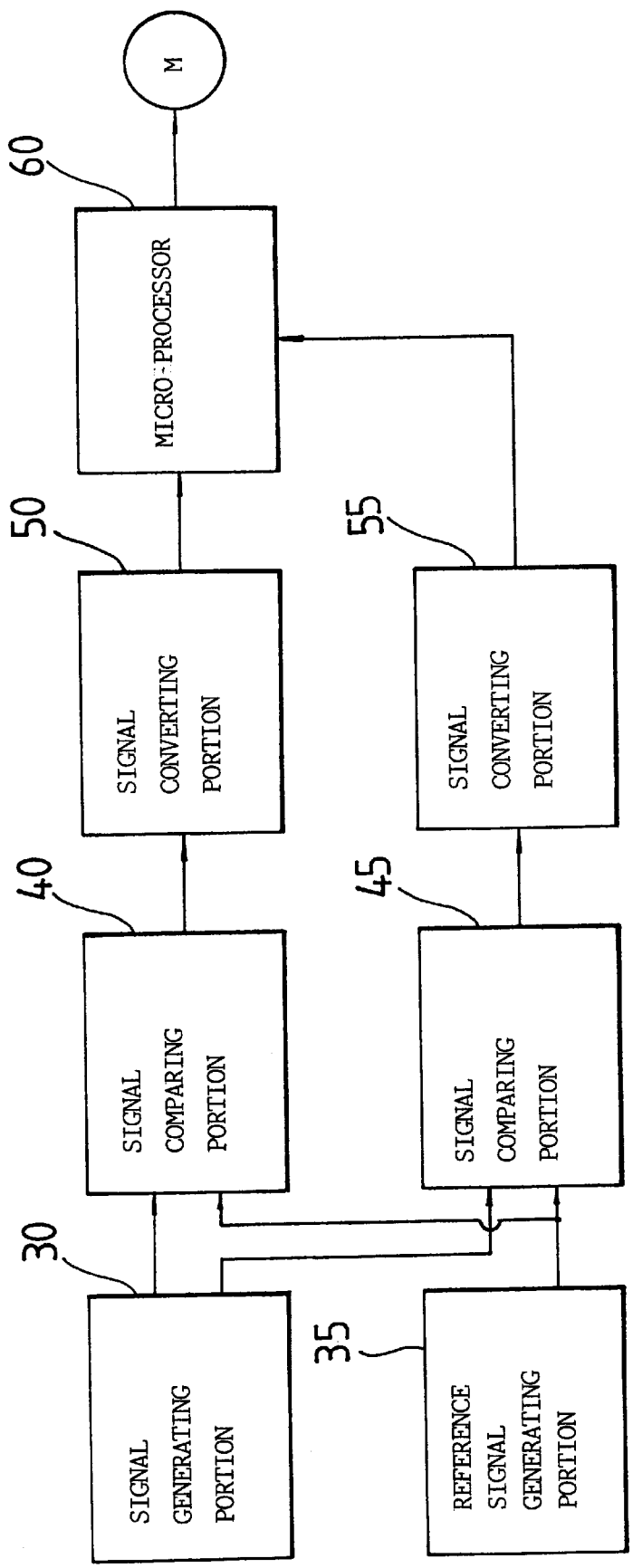

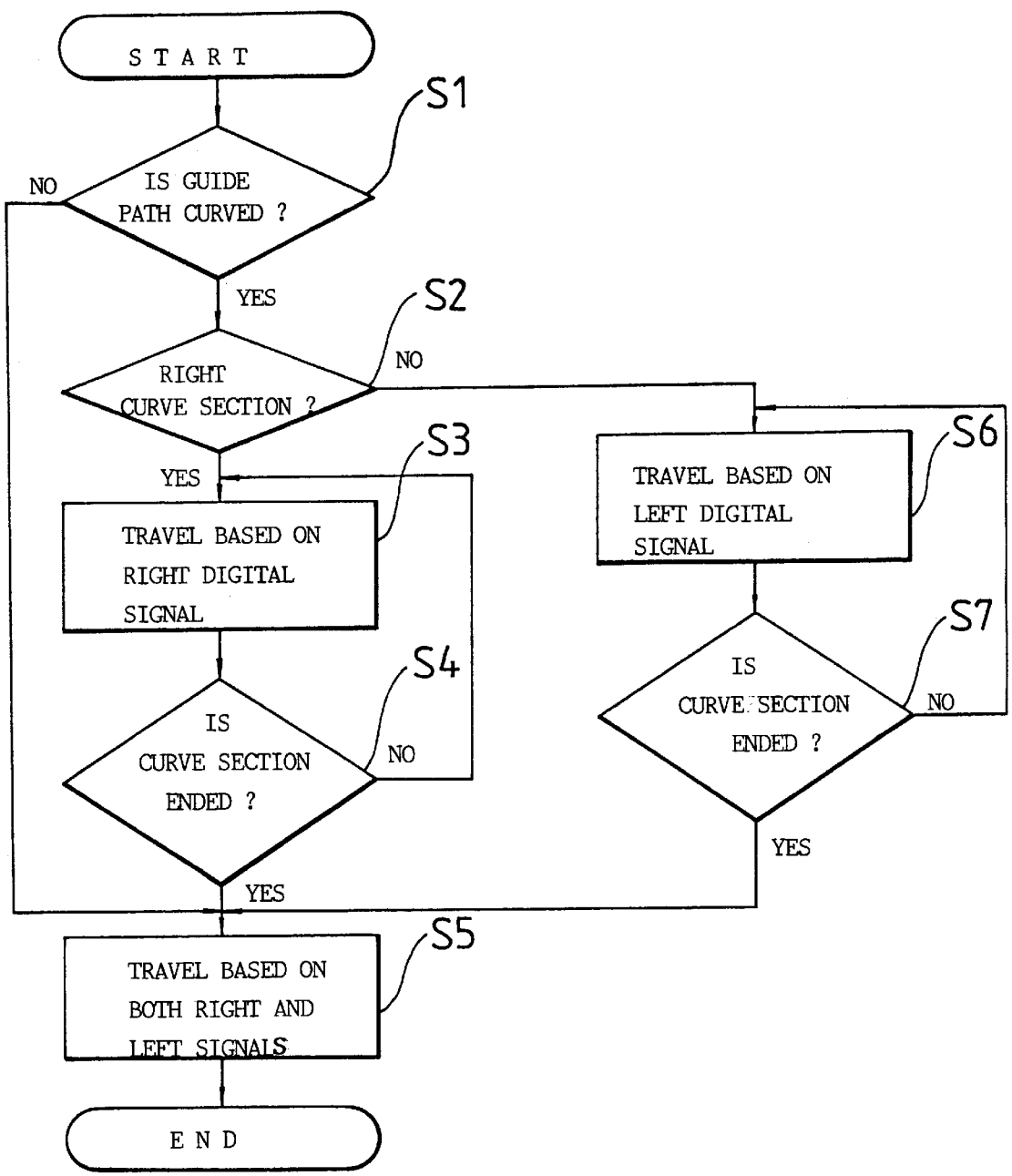

AUTOMATIC TRAVEL CONTROL METHOD FOR AN UNMANNED VEHICLE

This application is a continuation of application Ser. No. 08/547,445, filed Oct. 24, 1995, now abandoned, which is a continuation of 08/111,495, filed Aug. 25, 1993, now abandoned.

BACKGROUND OF THE INVENTION

1. Field of the Invention

The present invention is related to an automatic travel control method and apparatus for an unmanned vehicle, and particularly to an automatic travel control method and apparatus for keeping the body of the vehicle parallel with a specified guide path within the shortest possible distance at the end point of any curve in the guide path.

2. Description of the Prior Art

Conventionally, an unmanned vehicle system, which includes a front wheel and two rear wheels in the body thereof, has been developed. In the system, both steering and driving motors are equipped in the front wheel.

On the other hand, a guide wire (hereinafter, called a "guide path") is arranged in or on the floor of the factory and is energized by a low frequency alternating current, for example, between 3 kHz to 10 kHz, thereby generating a magnetic field therearound.

A pair of sensing coils, which sense the magnetic field generated by the guide path and which provide voltage outputs representative of the deviation of the coils from the guide path, are located at the left and right sides of the vehicle. The steering motor is then controlled based on the difference between the voltage outputs so that the front wheel can be turned to the left or right.

In the conventional unmanned vehicle system, the pair of sensing coils are symmetrically positioned at the left and right sides of the body of the vehicle. A pair of band-pass filters, each of which allows only a voltage signal with the same frequency as the alternating current flowing in the guide path to pass therein, are connected to the respective output terminals of the coils, and a pair of operational amplifiers are then connected to the respective output terminals of the band-pass filters. The two signals from the operational amplifiers are fed to a differential amplifier.

In the configuration described above, when the vehicle travels along a linear section of the guide path, voltage signals with a similar magnitude are induced to the sensing coils. Accordingly, the differential amplifier outputs a signal of 0[V] to the steering motor, thereby not activating the steering motor. Consequently, the vehicle travels straight along the guide path.

On the other hand, when the vehicle travels along a curved section of the guide path, different voltages are induced to the sensing coils. The differential amplifier then amplifies the difference in voltage and supplies the amplified voltage signal to the steering motor. Thus, the steering motor is activated to cause the vehicle to turn left or right along the guide path.

FIG. 1 is a diagram showing the various positions of a traveling vehicle according to a conventional unmanned vehicle system.

Referring to FIG. 1, in the conventional unmanned vehicle system, the rear part of the vehicle 10 travels with a tendency toward the inside of the guide path 15 due to the difference in the rotational radius of the front and inner rear wheels.

Consequently, the body of vehicle 10 cannot remain parallel with a conveyor 20 located at the linear section adjacent to the curved section in the guide path 15, which causes errors in transferring and loading work.

On the other hand, an example of a unmanned vehicle system is disclosed in Japanese Patent Laid-Open Publication No. 297707 (1989).

However, the unmanned, vehicle system disclosed in the Japanese Publication is intended to guide an unmanned vehicle in a correct direction even where guide paths intersect by determining the correct travel path from the output of two sensing circuits which resonate with a guide frequency for the unmanned vehicle where the guide paths for a plurality of unmanned vehicles with different guide frequencies intersect.

SUMMARY OF THE INVENTION

It is an object of the present invention to provide an automatic travel control method and apparatus for an unmanned vehicle for keeping the body of the vehicle parallel with a specified guide path within the shortest possible distance at the end point of any curved section in the guide path.

It is another object of the present invention is to provide an automatic travel control method and apparatus for an unmanned vehicle used to increase the space efficiency of a factory.

An automatic travel control method according to the present invention is performed according to signals representative of a curved section of a guide path and right and left digital signals representative of the degree of curvature of the guide path.

In the method, (1) where the guide path is straight, the steering of the vehicle is controlled based on both the right and left digital signals; (2) where the guide path is curved to the right, the steering of the vehicle is controlled based on the right digital signal; and (3) where the guide path is curved to the left, the steering of the vehicle is controlled based on the left digital signal.

The path curvature sensing operation is performed according to the levels of the voltage signals induced to a pair of voltage generating portions located at the right and left sides of the vehicle after generating a magnetic field by applying an alternating current to the guide path.

The right and left digital signals generating operation is performed by converting the voltage signals induced to the pair of voltage generating portions into corresponding digital signals.

BRIEF DESCRIPTION OF THE DRAWINGS

These and other aspects of the present invention are clarified by reference to the accompanying drawings in which:

FIG. 3 is a block diagram showing a configuration for detecting the existence of a curve section of the guide path; and, FIG. 4 is a flow chart showing an automatic travel control method according to the present invention.

DETAILED DESCRIPTION OF THE PREFERRED EMBODIMENT

Hereinafter, the preferred embodiment of the present invention will be described in detail with reference to the accompanying drawings.

Figure 2:
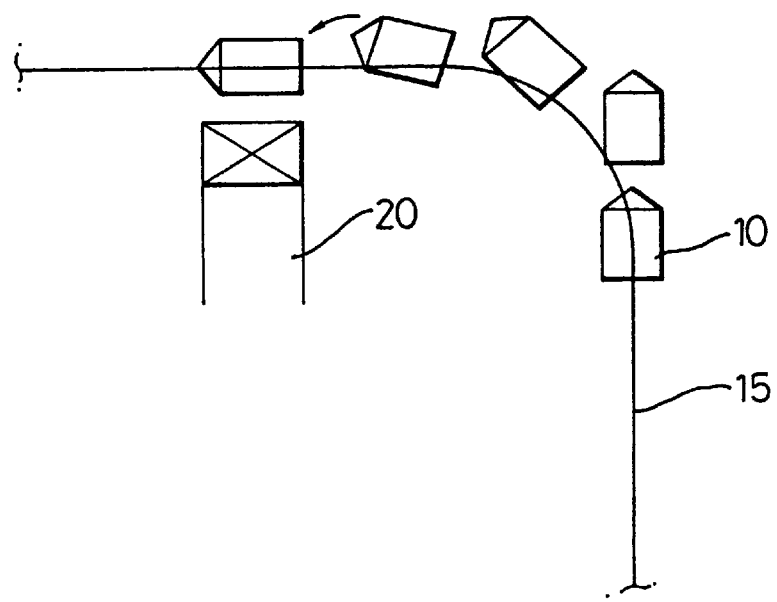
FIG. 2 is a diagram showing the various positions of a traveling unmanned vehicle according to the control method of the present invention.

FIG. 2 is a diagram showing the various positions of a traveling unmanned vehicle according to the control method of the present invention.

Figure 1:
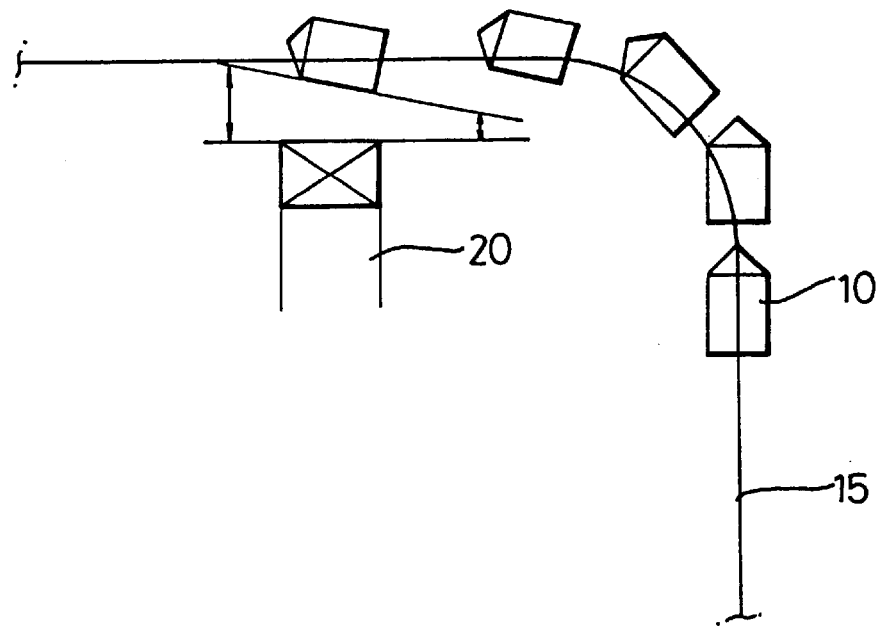
FIG. 1 is a diagram showing the various positions of a traveling unmanned vehicle according to a conventional unmanned vehicle system.

In FIG. 2, the same reference number is given to the same parts as shown in FIG. 1.

Referring to FIG. 2, the unmanned vehicle travel control system is comprised of an unmanned vehicle 10 and a guide path 15 which is arranged on the floor of a factory so as to automatically guide the movement of the vehicle 10. Several conveyors 20 for loading and then transferring workpieces supplied from the vehicle 10 are arranged parallel to the guide path 15. An alternating current with a low frequency, for example a frequency in 3 to 10 kHz range, passes through the guide path 15, thereby generating a magnetic field around the guide path 15.

Referring to FIG. 3, a device for detecting the existence of a curved section includes a signal generating portion 30, a reference signal generating portion 35, a first and second signal comparing portion 40 and 45, a first and second signal converting portion 50 and 55, and a microprocessor 60.

The signal generating portion 30 is comprised of a pair of sensing coils and is located at the left and right sides of the vehicle 10. The signal generating portion 30 detects the magnetic field generated from the guide path 15 and provides voltage outputs representative of the deviation of the vehicle 10 from the guide path 15 for the input terminal of the respective signal comparing portions 40 and 45. The output terminal of the reference signal generating portion 35 is connected to another input terminal of the respective signal comparing portions 40 and 45. The signal comparing portions 40 and 45 compare the voltage signal output from the respective sensing coils 30 with the reference voltage signal from the reference signal generating portion 35 and output a high or low level voltage signal to the respective signal converting portions 50 and 55. The signal converting portions 50 and 55 convert the voltage signal from the respective signal comparing portions 40 and 45 into a voltage signal with a magnitude appropriate for the microprocessor 60. However, if the magnitude of the voltage signal from the signal comparing portions 40 and 45 is the same as that of the microprocessor 60, the signal converting portion 50 and 55 may be omitted in the sensing device shown in FIG. 3. The microprocessor 60 determines whether or not the guide path 15 is curved, based on the signal from the signal comparing portion 40 and 45. For example, if the first signal comparing portion 40 generates a low level signal and the second signal comparing portion 45 generates a high level signal, the microprocessor 60 determines that the guide path 15 is curved to the right. If the situation is opposite to this, the microprocessor 60 determines that the guide path 15 is curved to the left. On the other hand, if both the first and second signal comparing sections 40 and 45 output a high level signal, the microprocessor 60 determines that the guide path 15 is straight.

Not shown in FIG. 3 is a device for sensing the degree of curvature of the guide path 15 which includes a pair of sensing coils, a pair of band-pass filters, a pair of operational amplifiers, a pair of rectifier circuits, and a pair of analog to digital converters. Because the connections between sensing coils, band-pass filters, and operational amplifiers have already been described, further explanation will be omitted.

The output terminal of the operational amplifiers is connected to the respective rectifier circuits to output a D.C voltage signal in proportion to the A.C voltage signal from the respective operational amplifiers. The output terminal of the rectifier circuits is connected to the respective analog to digital converters to convert the analog voltage signal from the rectifier circuits into a corresponding digital signal. The digital signal converted by the analog to digital convertors is finally provided to the microprocessor 60. The microprocessor 60 then controls the steering of the vehicle 10, based on the converted digital signal.

Hereinafter, the automatic traveling control method will be described in detail.

Initially, when an A.C. current is applied to the guide path 15, the vehicle 10 begins to travel along the guide path 15. At this time, the curved section sensing device as shown in FIG. 3 is activated, thereby detecting the existence of a curved section in the guide path 15 (S1). In the detecting operation, if the variation in the magnetic field is not detected through the sensing coils 30, the signal converting portions 50 and 55 generate voltage signals of the same level, for example a high level. The microprocessor 60 then determines that the current direction of guide path 15 is straight.

Furthermore, when the guide path 15 is straight, both the analog to digital converters output left and right digital signals of the same value to the microprocessor 60. The microprocessor 60 then controls the steering motor so that the vehicle 10 may travel along the straight guide path 15 (S5), based on both the right and left digital signals.

In the preferred embodiment, the respective digital signal is formed of 4 bits. However, the greater the number of bits, the more precise the control will be. On the other hand, when the variation in the magnetic field is detected through the sensing coils 30, the signal converting portions 50 and 55 generate voltage signals with levels different from each other. For example, when the first signal converting portion 50 generates a low level signal and the second signal converting portion 55 generates a high level signal, the microprocessor 60 determines that the guide path 15 is curved to the right. If the situation is opposite to this, the microprocessor 60 determines that the guide path 15 is curved to the left.

When the guide path 15 is curved to the right or to the left, the analog to digital converters output the right and left digital signals with values different from each other to the microprocessor 60. The microprocessor 60 then controls the steering motor so that the vehicle 10 is turned to the right or to the left along the guide path 15 until the end of the curved section of the guide path 15 by the digital signal derived from the sensing coil located in the same direction as the curvature of the guide path 15. That is, when the guide path 15 is curved to the right, the microprocessor 60 controls the steering motor by the right digital signal (S4), and when the guide path 15 is curved to the left, the microprocessor 60 controls the steering motor by the left digital signal (S6).

In order for the vehicle 10 to travel along the outside of the guide path 15, the steering operation is controlled by the medium value of the respective digital data.

When the curved section ends, the microprocessor 60 controls the steering of the vehicle 10 so that the vehicle 10 then travels along the straight guide path 15 by using both the right and left digital signals.

In the manner described above, the vehicle 10 is kept parallel with the guide path 15 within the shortest possible distance from the end of the curved section in the guide path 15.

I claim:

1. An automatic travel control method for an unmanned vehicle system, wherein said system controls steering of the unmanned vehicle over a guide path which guide path contains at least any two of a straight portion, a right curved portion and a left curved portion, said method comprising the steps of:

detecting existence of curvature of the guide path;

generating right and left digital signals indicating the degree of the curvature of the guide path using only a single pair of voltage generating devices;

controlling the steering of the vehicle based only on both the right and left digital signals when the vehicle is traversing any straight portion of the guide path;

controlling the steering of the vehicle based only on the right digital signal when the vehicle is traversing any right curve portion of the guide path; and controlling the steering of the vehicle based only on the left digital when the vehicle is traversing any left curved portion of the guide path.

2. An automatic travel control method according to claim 1, wherein the step of detecting the existence of the curvature comprises the step of applying alternating current to the guide path for inducing voltage signal levels at a pair of voltage generating devices located at the right and left sides of the vehicle.

3. An automatic travel control method according to claim 2, wherein the step of generating said right and left digital signals comprises the step of converting the voltage signals induced to said pair of voltage generating devices into corresponding digital signals.

* * * * *